April 6, 1926.
C. A. BORNMANN
SEMIAUTOMATIC FILM WINDING CAMERA
Filed Dec. 26, 1924
1,579,752
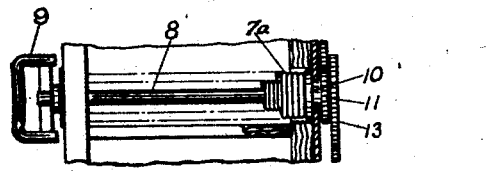
INVENTOR
CARL A. BORNMANN
BY
Philip S. Hopkins
ATTORNEY Patented Apr. 6, 1926.

1,579,752

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

SEMIAUTOMATIC FILM-WINDING CAMERA.

Application filed December 26, 1924. Serial No. 758,130.

*To all whom it may concern:*

Be it known that I, CARL A. BORNMANN, a citizen of the United States, and a resident of the city of Binghamton, county of Broome, and State of New York, have invented certain new and useful Improvements in a Semiautomatic Film-Winding Camera, of which the following is a description, reference being had to the accompanying drawing, which forms a part of this specification.

This invention relates generally to cameras and is particularly directed to that type or roll film camera having power means for winding up the exposed portion of the film and bringing a new unexposed portion into proper position. Although the preferred form of my invention is as shown adapted to a folding camera, it should be understood that the same may be readily applied to a camera of the box type.

The primary object of my invention is to provide a camera with certain simple, inexpensive and easily assembled parts which, when operated after an exosure has been made, will cause the exposed section of the film to be immediately wound into position without the usual trouble and time required in the ordinary camera in which the film is wound by hand through the medium of a winding key. This enables the operator to make successive exposures very rapidly and without further effort than simply depressing a small lever to release the winding mechanism.

Another and important object is to so arrange the parts as to place this lever in the most convenient position for operation so that the same may be at all times within quick and easy access of the hand of the operator.

A still further object lies in providing means for automatically throwing or projecting the operating lever to operative position when the camera is opened into position for use.

Another object is to so arrange and locate the various parts necessary to perform the above mentioned functions that they require a very slight additional amount of space over that already provided in cameras now in use.

Other objects and advantages in detail of construction and operation will be apparent as the description proceeds, reference being had to the accompanying drawing wherein like reference numerals indicate like parts.

In the drawing:

Figure 1 is a side view of my improved camera the cover or closure cap being removed to illustrate the assembled parts, Figure 2 is an enlarged detail view of the operating lever and its co-acting parts.

Figure 3 is a detail plan of this lever.

Figure 4 is a detail showing clearly the operation of the releasing device for the winding mechanism.

Figure 5 is another detail illustrating the preferred type of motor or power source used in driving the winding mechanism.

A folding camera of the type mentioned is indicated generally by the reference numeral 1. This camera is provided with the usual hinged platform or bed 2, view finder, 3, lens and shutter 4 and bellows 5. At one side of the camera is mounted the winding mechanism for automatically driving the take up spool 6 for the purpose of winding the film thereon from the supply spool 7.

This mechanism is driven by a motor or other source of power and as in the form illustrated, comprises a coil spring $7^a$ disposed crosswise of the camera body. This spring motor includes an inner and outer coil wound spirally of the shaft 8, (See Figure 5) and a winding key 9 is provided on one end of the shaft for placing the spring under tension. Any suitable means such as a pawl and ratchet device (not shown) is provided for holding the spring under tension when wound.

One end of the outer coil spring $7^a$ is secured to a sleeve 10 suitably journaled in the side of the camera on which the winding mechanism is placed, said sleeve being under constant tension for rotation by the motor. Carried by the sleeve 10 is a pinion 11 meshing with a pinion 12 carrying the gear 13 which in turn meshes with and drives the pinion 14 which operates to rotate the take up spool 6 for winding the film thereon. The detailed construction and operation of this motor and its coacting parts is shown and described clearly in U. S. Patent No. 1,197,901.

Also driven by the gear 13 is a train of gears indicated in dotted lines in Figure 1, beginning with gear 15 and ending in pinion 16. The pinion 16 drives a centrifugal governor indicated generally at 17 of any preferred form for regulating and controlling the speed at which the winding mechanism operates.

Carried by gear 15 is a dog 18 provided with a straight shoulder 19 for a purpose to be described. Pivoted near one edge of the side of the camera carrying this mechanism, as at 20, is a lever 21 provided intermediate its ends with a shoulder 22 adapted to engage with the shoulder 19 of the dog 18, and when in such engagement, to stop the rotation of gear 15 and consequently of the entire winding mechanism. The free end of the lever 21 is bifurcated as at 23 and a pin 24 engaging in said bifurcation guides the lever 21 and limits its movement in either direction. Also carried by the lever 21 and projecting slightly from the side thereof is a pin 25 for a purpose to be described.

At the lower end of the camera 1 is suitably journaled a short stub shaft 26, the inner end of which projects through the side of the camera and into the recess 27 in the body thereof. Upon the inner end of this stub shaft is mounted a sleeve 28 by means of set screw 29. Rigid with the sleeve 28 is one end of an operating lever 30. It will be seen that upon movement of the lever 30 the shaft 26 will be rocked in its bearings. A spring is coiled about the shaft 26 and has one end 31 thereof anchored against any convenient rigid part of the camera and the opposite end 32 suitably secured to the top edge of lever 30. It will be understood therefore that the lever 30 is normally under tension because of the spring 32 to assume the outwardly projected position shown in Figures 1 and 2. It will also be noted that because the spring 32 is yieldable, the lever 30 can assume a vertical position within the recess 27 when the camera is closed or in other words when the platform 2 is raised to its folded position. This is a matter of importance because of its great convenience. No attention need be paid to the operating lever 30 because when the camera is closed the platform 2 simply engages with the under side of the lever 30 and raises it to vertical position within the camera against the tension of the spring 32. Immediately upon opening the camera and dropping the platform 2, the spring 32 will throw the lever 30 into operative position.

The outer end of the shaft 26 carries rigidly therewith an arm 33, the free end of which is bent at right angles as shown in dotted lines at 34. This angular portion of the arm, when the lever 30 is in its lowered position, is adapted to engage one end of the adjusting screw 35 carried by a controlling lever 36. It will be understood from reference to Figures 1 and 2 that upon depressing lever 30 the arm 33 engaging with the adjusting screw 35 will rock the lever 36 to the left, said arm 36 being loosely journaled on the shaft 26. A heavy coil spring 37 anchored at one end to the rigid pin 38 carried by the camera and its opposite end engaging a pin 39 carried by the arm 36 normally forces said arm 36 to the extreme right in Figure 1 which is its normal position as will be hereafter explained.

Pivoted to the lever 36 near the upper end thereof is a pawl 40. An ear 41 is bent at right angles from one edge of the pawl 40 and is adapted to engage with the edge 42 of lever 36. A light spring 43 normally holds the pawl in such engagement with the lever 36.

From the foregoing it will be understood that the pawl 40 can be rocked on its pivot in one direction only. It is carried by the lever 36 to the left in Figures 1 and 4 but when ear 41 engages the lever 36, the pawl is held against movement in the opposite direction.

The pawl 40 is provided on its edge opposite the ear 41 with a straight shoulder 44. The bottom edge of the pawl is bevelled as shown at 45. As shown clearly in Figure 4, the shoulder 44 of the pawl lies directly in the path of the pin 25 carried by the pivoted lever 21. It will be seen therefore that movement of the controlling lever 36 to the left in Figures 1 and 4, as by pressure on the operating lever 30, the pawl 40 will engage the pin 25 and rocking on its pivot will be permitted to slide past said pin so that at the limit of movement to the left of the lever 36 the pawl 40 will be rocked back to its normal position with respect to lever 36 and the bevelled edge 45 of the pawl will be in position to engage the pin 25 upon the return movement to the right. Obviously upon such return movement the bevelled edge 45 now being rigid because of ear 41 engaging the lever 36, will force the lever 21 carrying the pin 25 downwardly against the tension of the spring 46 thereby disengaging the shoulders 19 and 22. This permits rotation of the gear 15 and consequently of the rest of the winding mechanism under the action of the motor.

Of course immediately upon the lever 36 and pawl 40 completing their movement to the right, the bevelled edge 45 of the pawl will slide past the pin 25 permitting the spring 46 to return the lever 21 to its normal position where the shoulder 22 again lies in the path of the shouldered dog 18 whereby the winding mechanism will be again stopped upon the completion of one revolution of the gear 15. The gear ratio of this winding mechanism is so arranged that one such revolution of gear 15 drives the take up spool 6 a sufficient number of turns to cause a new unexposed length of film to be drawn into the focal plane of the camera.

It should be particularly noted that the operating lever 30 is placed on the left side of the camera when the same is in picture taking position. As the camera is normally supported by the left hand of the operator grasping the platform 2, it will be obvious that the lever 30 with its finger piece 47 will be within easy reach of the left thumb of the operator so that as soon as the shutter has been snapped in the usual manner with the right hand, the lever can be depressed and released whereby the film will be automatically wound without changing the position of the camera.

Briefly the operation of my invention is as follows:

A film cartridge is placed in the camera in the usual manner and the spring motor is tightly wound through the medium of the winding key 9. The platform 2 is then lowered and the spring 32 throws the operating lever 30 down to operating position, bringing the arm 33 into engagement with the set screw 35 on the controlling lever 36. The lens and shutter are then extended upon the platform and such adjustments made as to focusing, etc., as are necessary. The operator then grasps the camera with the left hand underneath the platform 2 to hold the camera level for the exposure. In this position the left thumb will normally lie directly adjacent the operating lever 30. After the shutter has been snapped in the usual manner by the right hand of the operator and an exposure made, all that is necessary to wind the exposed length of film onto the take up spool 6 and bring a fresh length into position for subsequent exposure is to press the lever 30 with the left thumb and immediately release same. It will be noted that due to this arrangement for winding the film, the operator need not change the position of the camera but can keep the same directed at the subject for a quick second exposure if desired.

From the foregoing description, it will be understood that as the lever 30 is depressed, the controlling lever 36 will be rocked to the left in Figure 1 carrying with it the pawl which rocks past the pin 25 on the lever 21 without in any way affecting the position of said lever. When the operating lever 30 is released, the spring 37 acts to immediately throw the controlling lever 36 back to the right upon which movement the lower bevelled end 45 of the pawl 40 engages against the pin 25 and as the pawl 40 is now unable to yield in this direction because of the ear 41 engaging with the edge of the lever 36, said lever 21 will be depressed against the action of the spring 46 whereby the shoulder 19 and 22 will be disengaged and the winding mechanism freed for rotation under the power of spring motor 7a. At the completion of the movement of lever 36 and pawl 40 to the right, said pawl will have ridden completely over and past the pin 25, thus releasing the lever 21 to return to its normal position shown in Figures 1 and 4 under the tension of its spring 46. In this position, the shoulder 22 will again lie in the path of the shoulder 19 whereby upon the completion of one revolution of gear 15, the winding mechanism will be brought to a stop. As before stated, this one revolution of the gear 15 is sufficient to wind the entire exposed length of film upon the spool 6.

It will be seen therefore that I have provided a quick winding camera of simple construction and easy operation which eliminates the effort required and the delay incident to the winding of the film in the usual manner by hand. The placing of the operating lever for the winding mechanism conveniently adjacent the operator's hand so that a change in the position of the camera is unnecessary for the winding operation, will also be recognized as a distinct advance in the art.

Of course the embodiment of my invention herein shown and described is susceptible to many and various changes in details of construction and operation without departing from the scope of the invention. I do not limit myself therefore to the exact structure disclosed other than by the appended claims.

I claim:

1. A winding mechanism for cameras comprising a motor driven gear train for rotating the take up spool, stopping and releasing mechanism for said gear train, an operating lever for said mechanism pivoted in said camera and a spring for normally projecting said lever to operative position when said camera is opened.

2. A winding mechanism for cameras comprising a motor driven gear train for rotating the take up spool, stopping and releasing mechanism for said gear train, an operating lever for said mechanism adapted to be folded into the camera body by closing the platform of said camera, and a spring for automatically projecting said lever to operative position upon lowering said platform, and a finger piece on said lever.

CARL A. BORNMANN.